(12) United States Patent
Mombers et al.

(10) Patent No.: US 8,493,509 B2
(45) Date of Patent: Jul. 23, 2013

(54) DIGITAL VIDEO FORMATTING SCHEME FOR ANALOG FORMAT VIDEO SIGNALS USING ADAPTIVE FILTERING

(75) Inventors: Friederich Mombers, Sunnyvale, CA (US); Alain-Serge Porret, Sunnyvale, CA (US); Melly Thierry, Lausanne (CH)

(73) Assignee: SiGear Europe Sarl, Lausanne (CH)

( * ) Notice: Subject to any disclaimer, the term of this patent is extended or adjusted under 35 U.S.C. 154(b) by 128 days.

(21) Appl. No.: 13/160,311

(22) Filed: Jun. 14, 2011

(65) Prior Publication Data

US 2012/0320264 A1    Dec. 20, 2012

(51) Int. Cl.
*H04N 7/01* (2006.01)
*H04N 11/20* (2006.01)
*H04N 7/04* (2006.01)

(52) U.S. Cl.
USPC .......................................... 348/469; 348/441

(58) Field of Classification Search
USPC ................................. 348/515, 441
See application file for complete search history.

(56) References Cited

U.S. PATENT DOCUMENTS

| | | | |
|---|---|---|---|
| 4,384,302 A * | 5/1983 | Schwarz | 348/612 |
| 5,268,761 A * | 12/1993 | White | 348/678 |
| 6,281,945 B1 * | 8/2001 | Jun et al. | 348/678 |
| 7,222,037 B2 | 5/2007 | Mushirahad et al. | |
| 7,227,585 B1 | 6/2007 | Murdock et al. | |
| 7,664,369 B2 | 2/2010 | Wrobleski et al. | |
| 7,738,332 B2 | 6/2010 | Minemura | |
| 7,746,969 B2 | 6/2010 | Bryan et al. | |
| 7,804,356 B2 | 9/2010 | Gomez et al. | |
| 2003/0156635 A1 | 8/2003 | Fernandez-Corbaton et al. | |
| 2004/0183953 A1* | 9/2004 | Nave | 348/678 |
| 2008/0100742 A1* | 5/2008 | Mogre et al. | 348/445 |

\* cited by examiner

*Primary Examiner* — Jefferey Harold
*Assistant Examiner* — Michael Teitelbaum
(74) *Attorney, Agent, or Firm* — Van Pelt, Yi James LLP (57) ABSTRACT

A digital video formatting system operates to format an analog format video signal to within a desired amplitude range using an adaptive filtering scheme which implements flat gain scaling, frequency-dependent gain scaling and adaptive offset correction. The adaptive filtering scheme selects a frequency-independent flat gain scaling mode or a frequency-dependent gain scaling mode based on the characteristics of the active video signal. The filtered video signal is fed back to an adaptive weight computation block to update the offset correction value, the filter coefficients and the mode selection signal.

20 Claims, 7 Drawing Sheets

DIGITAL VIDEO FORMATTING SCHEME FOR ANALOG FORMAT VIDEO SIGNALS USING ADAPTIVE FILTERING

FIELD OF THE INVENTION

The present invention relates to a television signal receiver, and in particular, the present invention relates to a system and method for formatting an analog video signal using a digital automatic gain control (AGC) scheme.

DESCRIPTION OF THE RELATED ART

A television (TV) or video recorder includes a television signal receiver (or television receiver) to receive terrestrial broadcast, cable television or satellite broadcast television signals and to process the television signals into the appropriate video and audio signals for display or for recording. Television signals are transmitted in analog or digital formats and in accordance with a variety of standards. For analog television transmission, the NTSC (National Television Standards Committee) standard, the PAL (Phase Alternate Lines) standard, and the SECAM (Sequential Couleur Avec Memoire) standard are widely adopted. On the other hand, for digital television (DTV) transmission, the DVB (Digital Video Broadcast) format and the ATSC (Advanced Television Standards Committee) format are available. The different television formats and different television standards are incompatible and television receivers are traditionally made specifically for the analog or digital format and for a specific standard. However, television receivers for receiving both analog and digital formats and for receiving multiple television standards have been developed.

A television receiver receives the incoming television signal in radio frequency (RF) and converts the incoming RF signal to an intermediate frequency (IF) signal. Then, the receiver converts the IF signal to a video baseband signal and an audio baseband signal using one or more demodulators. The baseband signals are then coupled to appropriate video and audio decoders to generate the display video signals (e.g. RGB) or sound signals. In general, the conventional television receiver includes a tuner for receiving the input RF signal and converting the RF signal to an IF signal by one or more frequency conversions. The frequency conversions are generally implemented as single or dual super-heterodyne conversions. The intermediate frequency may be dictated by the geographical area the receivers are to be used. In some television receives, a low-IF or zero-IF architecture is used where the input RF signal is converted to a low IF signal or converted directly to baseband.

The demodulator of a television receiver is typically a dedicated component and designed specifically for a predetermined television signal format and a predetermined television standard. For analog television signal reception, the demodulator is a VIF/SIF module. The VIF/SIF module provides a video output called CVBS (Composite Video, Blanking, Sync, or Composite Video baseband signal) and audio outputs, such as MPX or A2. For digital television signal reception, the demodulator is a digital demodulator typically including a down-converter, an analog-to-digital converter and other supporting circuitry to perform the demodulation. The digital demodulator outputs data in a MPEG data stream.

Analog format video signals, such as the composite video signal CVBS, when transmitted over the air, received and properly demodulated can exhibit amplitude range distortion due to a poor signal source, frequency selective channel disturbance or receiver imperfections. Under normal operating conditions, the analog format video signal range should not exceed about 133 IRE (with 100% color modulation) corresponding to a 1.33V peak voltage. However, the aforementioned signal impairments can result in an analog format video signal having excursion above 133 IRE or below 0 IRE which will trigger clipping or overflow when the analog format video signal is processed by a digital signal processor unit that is connected to a digital-to-analog converter.

Television receivers typically perform signal scaling to scale down the amplitude range of the analog format video signal to avoid overflow. The signal scaling is typically carried out by an automatic gain control (AGC) system. Conventional television receivers perform AGC based on the sync pulse or sync tip of the horizontal blanking period to scale the sync pulse to be within the desired blanking level and the sync level (typically −40 IRE). This type of signal scaling has limited effect because the signal scaling is based only on the sync pulse. When the analog format video signal is scaled using the conventional AGC technique, the luminance video signal information may be scaled such that some of the luminance video signal information becomes not recoverable by subsequent video decoder.

SUMMARY OF THE INVENTION

According to one embodiment of the present invention, a digital video formatting system for a television signal receiver is configured to receive an input digitized analog format video signal and to generate an output digitized analog format video signal. The digital video formatting system includes an offset correction circuit configured to receive the input digitized analog format video signal and to introduce an offset correction value to the input digitized analog format video signal to generate an offset corrected analog video signal; an adaptive filter configured to receive the offset corrected analog video signal where the adaptive filter is operative to filter the offset corrected analog video signal based on one or more filter coefficients and based on a selected operation mode and the adaptive filter is configured to generate a filtered analog video signal, the filtered analog video signal being used to generate the output digitized analog format video signal; and an adaptive weight computation block configured to receive the filtered video signal and to generate the offset correction value, the one or more filter coefficients and a mode selection signal selecting one of two operation modes based on characteristics of the filtered video signal. In operation, the adaptive filter operates in a first operation mode to apply the one or more filter coefficients to scale an amplitude of the offset corrected analog video signal independent of signal frequency, and the adaptive filter further operates in a second operation mode to apply the one or more filter coefficients to scale the amplitude of the offset corrected analog video signal as a function of signal frequency.

According to another embodiment of the present invention, a method in a television receiver to format an input digitized analog format video signal and to generate an output digitized analog format video signal includes receiving the input digitized analog format video signal; introducing an offset correction value to the input digitized analog format video signal to generate an offset corrected analog video signal; filtering the offset corrected analog video signal based on one or more filter coefficients and based on a selected operation mode to generate a filtered analog video signal; generating the output digitized analog format video signal indicative of the filtered analog video signal; and generating the offset correction value, the one or more filter coefficients and a mode selection signal selecting one of two operation modes based on characteristics of the filtered video signal. The method further includes applying the one or more filter coefficients to scale an amplitude of the offset corrected analog video signal independent of signal frequency in a first operation mode, and applying the one or more filter coefficients to scale the amplitude of the offset corrected analog video signal as a function of signal frequency in a second operation mode.

The present invention is better understood upon consideration of the detailed description below and the accompanying drawings.

DETAILED DESCRIPTION OF THE PREFERRED EMBODIMENTS

In accordance with the principles of the present invention, a digital video formatting system operates to format an analog format video signal to within a desired amplitude range using an adaptive filtering scheme which implements flat gain scaling, frequency-dependent gain scaling and adaptive offset correction. More specifically, the adaptive filtering scheme automatically selects the flat gain scaling mode or frequency-dependent gain scaling mode based on the characteristics of the active video signal. The digital video formatting system with adaptive filtering scheme provides a simple and flexible method for correcting overmodulation and offset errors in analog format video signals.

In particular, overmodulated color video signals typically include large amount of high frequency signal components as the chroma modulated single or dual carriers are superimposed on the luminance signal over a predetermined bandwidth range. Furthermore, the luminance and chrominance signal overshoots occurring at the video signal edges typically include high frequency content and will increase signal overflow/underflow occurrence. According to one aspect of the present invention, the digital video formatting system operates to correct for overmodulated color video signals and correct for luminance/chrominance signal overshoots using frequency-dependent gain scaling. When the frequency-dependent gain scaling mode is applied, the video signal is subjected to selective frequency attenuation where the high frequency components of the video signal are attenuated. Selective frequency attenuation of the video signal can be carried out without appreciable signal degradation because the high frequency component of a video signal will be renormalized by the subsequent video decoder using the "color burst" color sync signal. Also, filtering the video signal overshoots improve signal quality by reducing visible ringing in the display images.

The digital video formatting system of the present invention operates on an "analog format video signal" or an "analog television signal," sometimes referred to simply as an "analog video signal." In the present description, the terms "analog format video signals" and "analog video signals" refer to television or video signals that are transmitted in the analog format. The video signals can be processed by the receiver in the analog domain or in the digital domain. When the analog format video signal is processed in the digital domain, the video will sometimes be referred to as "digitized analog format video signal" or "digitized analog video signal" to denote video signals that are in the analog television format but have been digitized. The digital video formatting system operates on an analog format video signal in the digital domain. The use of the term "digital" with reference to the "digital" video formatting system should not be confused with video signals in the digital television signal format (DTV).

In embodiments of the present invention, the digital video formatting system of the present invention receives digitized samples of an analog video signal being a composite video signal, such as the CVBS analog video signal. A composite video signal combines the brightness information (the luminance component) and the color information (the chrominance component) of the video signal and also includes synchronizing signals. In particular, the composite analog video signal is a modulated signal where the chrominance component is modulated on the luminance signal. The amplitude of the modulation is proportional to the amount of color and the phase information defines the tint or hue of the color.

Figure 1:
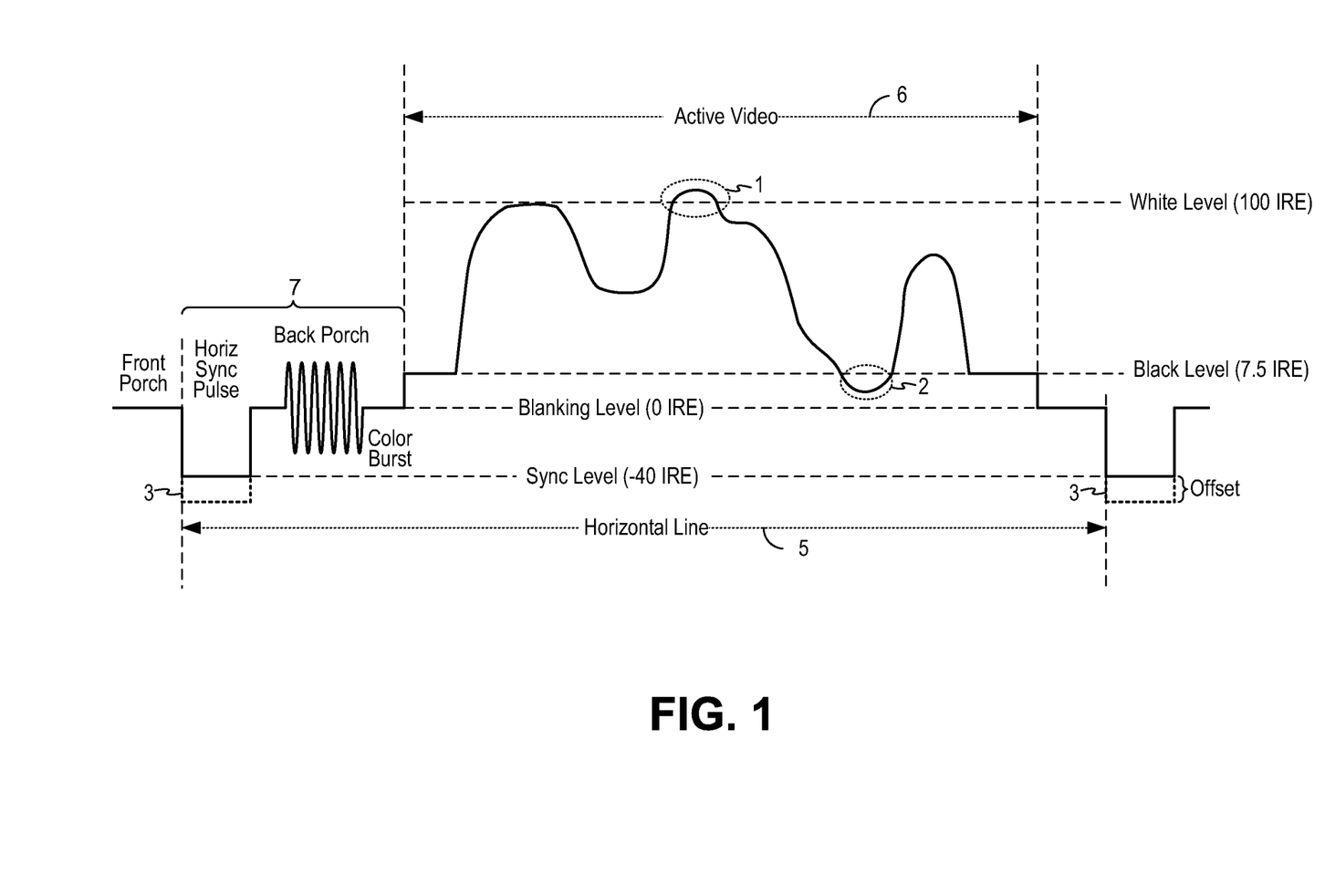
FIG. 1 illustrates a video signal line for a composite video signal.

A video image is made up of a number of video frames and each video frames is made up of a number of horizontal video lines. The number of video frames per second and the number of video lines per frame are defined for each television standard. At the end of each video frame, a vertical sync pulse is transmitted to indicate the end of the current video frame and the start of the next video frame. At the end of each horizontal video line, a horizontal sync pulse is transmitted to indicate the end of the horizontal line and the beginning of the next video line. FIG. 1 illustrates a video signal line for a composite video signal. Referring to FIG. 1, a video signal line 5 begins at the falling edge of a horizontal sync pulse and ends at the falling edge of the next horizontal sync pulse and includes an active video portion 6 and a horizontal blanking interval 7. The active video portion 6 contains the picture brightness (luminance) and color (chrominance) information. The brightness information is the instantaneous amplitude of the video signal line at any point in time while the color information is added or modulated on top of the luminance signal. The amount of modulation is proportional to the amount of color or saturation while the phase difference defines the hue of the color.

In the horizontal blanking interval, the horizontal front porch is the period of time between the end of the active video portion and the beginning of the next horizontal sync pulse. The horizontal back porch is the period of time between the end of the horizontal sync pulse and the beginning of the active video. The back porch includes a color burst which is a color sync signal or a color calibration reference signal. The color burst is typically 8-10 cycles of the color subcarrier signal and is used by the video decoder to synchronize or normalize the color information in the composite video signal.

The amplitude of the video signal is measured in terms of an IRE unit. The blanking level is the 0 IRE level and the sync pulse has an amplitude of −40 IRE. The reference black level can be at the blanking level (0 IRE) or in some video standards, the reference black level is placed at a setup level which may be 7.5 IRE above the blanking level. The reference white level is usually about 100 IRE. 133 IRE typically correspond to 1 voltage peak-to-peak.

The analog video signal ideally should have an amplitude range within the reference white level and the reference black level or the blanking level. However, poor signal source or channel disturbance can result in the analog video signal exceeding the maximum amplitude range, as shown by the dotted circle 1, or dropping below the minimum amplitude range, as shown by the dotted circle 2. Furthermore, the analog video signal may also suffer from offset errors, denoted by reference numeral 3. Although the conventional television receivers perform automatic gain control (AGC) to adjust the amplitude of the analog video signal, the conventional AGC operation is performed only on the sync pulse and the color burst signal of the video signal line. Conventional AGC operation determines a gain value based on the sync pulse and the blanking level signal which can result in the clipping of the video signal in an attempt to fit the video signal within the desired amplitude range. Indeed, the active video signal may experience overmodulation or undermodulation or offset errors which are not accounted for by the correction to the sync pulse or the blanking level in the conventional AGC process. According to embodiments of the present invention, a digital video formatting system is provided to normalize the range of the active video signal using adaptive filtering to ensure that the active video signal is within the desired amplitude range.

Figure 2:
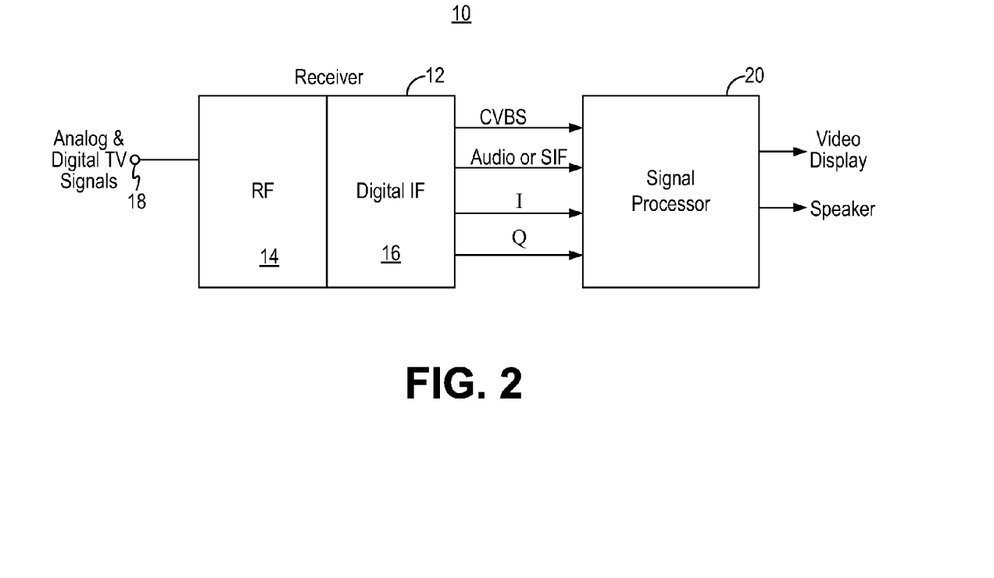
FIG. 2 is a block diagram of a television system according to one embodiment of the present invention

FIG. 2 is a block diagram of a television system according to one embodiment of the present invention. Referring to FIG. 2, a television system includes a receiver 12 for receiving television signals from an input terminal. The television signals may be received on an antenna or from a cable connection. Receiver 12 includes an RF processing block 14 and a digital IF processing block 16. The RF processing block 14 receives the incoming television signal in radio frequency (RF) and converts the incoming RF signal to an intermediate frequency (IF) signal. The IF signal is digitized as a digital IF signal. The digital IF signal is provided to the digital IF processing block 16 which converts the digital IF signal to a video baseband signal and an audio baseband signal using one or more demodulators. Receiver 12 generates a composite video signal, such as CVBS, and analog audio signals, such as SIF, for the analog television signal format. Receiver 12 may further generate in-phase I and quadrature phase Q signals for the digital television signal format. The composite video signal and/or the I and Q digital television signals are provided to a signal processor 20 which processes the video and audio signals, including decoding the signals, and generates video signals for the display and audio signals for the speakers.

Figure 3:
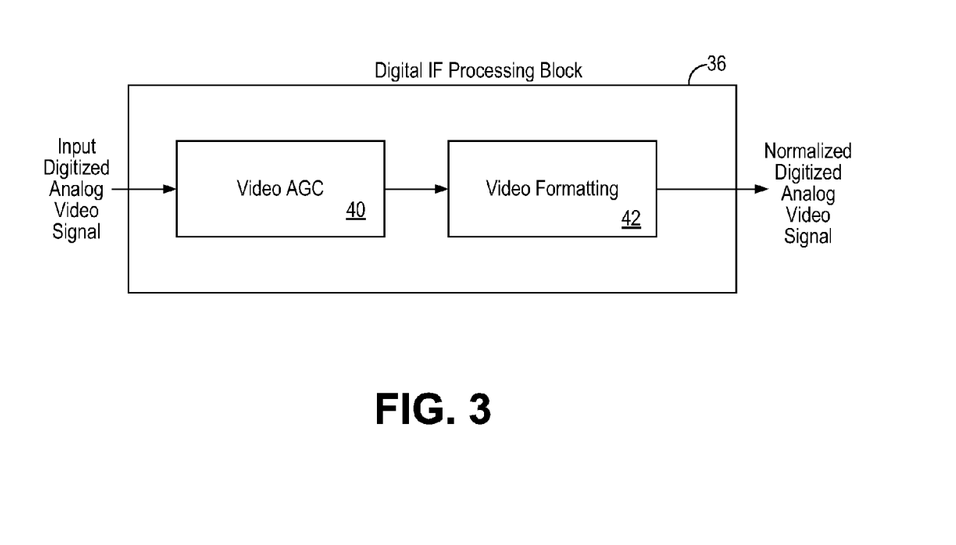
FIG. 3 illustrates a digital IF processing block of a television receiver according to one embodiment of the present invention.

In the digital IF processing block of the television receiver 12, the received analog video signal is normalized by a video AGC system to scale the signal to be within the desired amplitude range for subsequent circuitry, such as the conversion range of the digital-to-analog converter. FIG. 3 illustrates a digital IF processing block of a television receiver according to one embodiment of the present invention. Referring to FIG. 3, in the digital IF processing block 36, an input digitized analog format video signal ("input digitized analog video signal"), such as a composite video signal, is first provided to a video AGC circuit 40 for performing automatic gain control. The video AGC circuit 40 operates on the sync pulse and/or the blanking level of the video signal line to determine the amount of gain to be applied to the input digitized analog video signal.

Then, the input digitized analog video signal, as modified by the video AGC circuit 40, is provided to a digital video formatting circuit 42 to further format the input digitized analog video signal in accordance with embodiments of the present invention. More specifically, the digital video formatting circuit 42 operates on the input digitized analog video signal itself using adaptive filtering to bring the video signal within the desired amplitude range for the subsequent circuitry in the television system. The digital video formatting circuit 42 generates a normalized digitized analog video signal having the desired amplitude range and offset correction.

Figure 4:
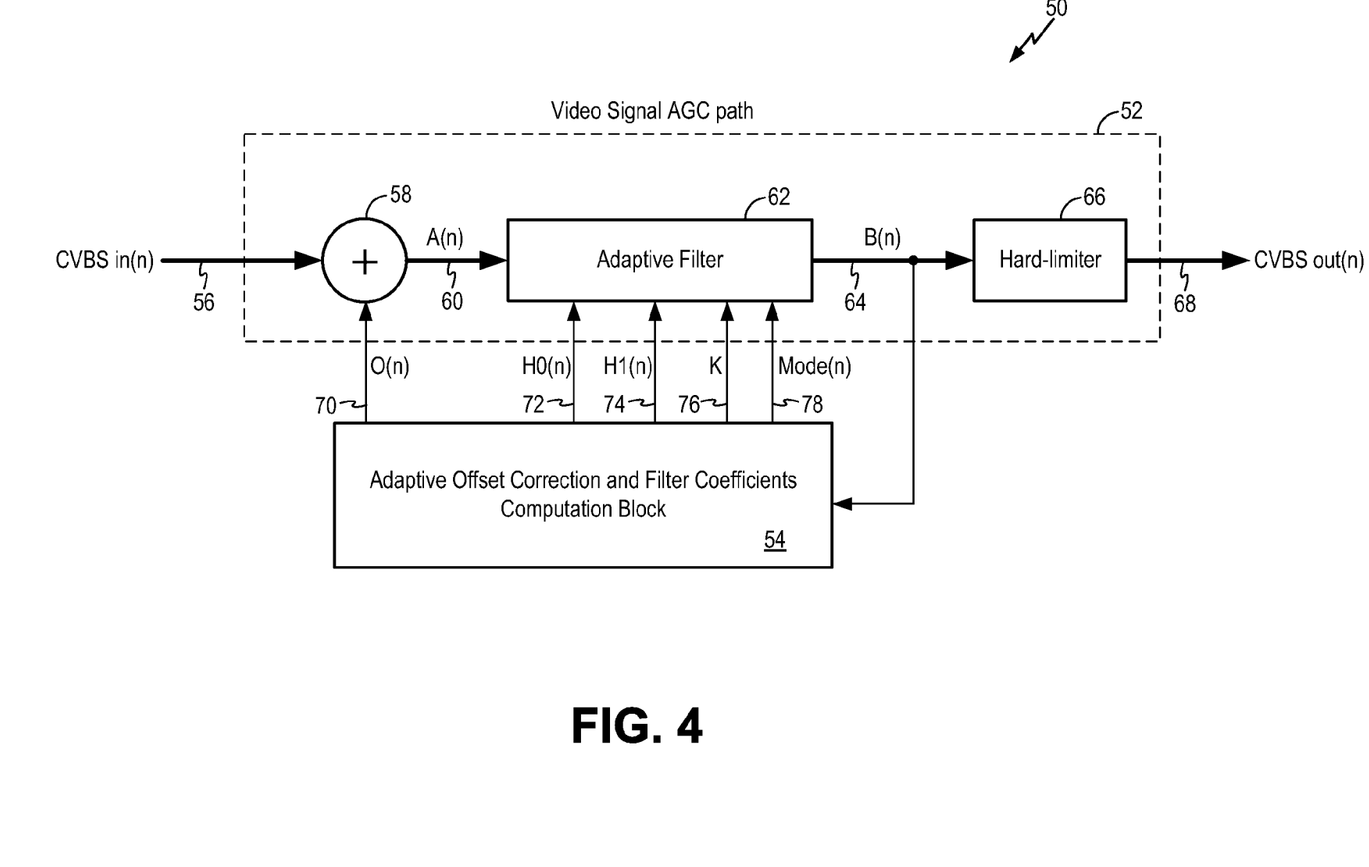
FIG. 4 illustrates a digital video formatting system implementing adaptive filtering according to one embodiment of the present invention.

FIG. 4 illustrates a digital video formatting system implementing adaptive filtering according to one embodiment of the present invention. Referring to FIG. 4, a digital video formatting system 50 includes a video signal AGC path 52 and an adaptive offset correction and filter coefficients computation block 54 (hereinafter "adaptive weight computation block"). The digital video formatting system 50 receives an input digitized analog video signal on an input node 56. In one embodiment, the input digitized analog video signal is a composite video signal. The input digitized analog video signal may be a digitized analog format video signal that has been normalized by the conventional video AGC operation, such as using the video AGC circuit 40 of FIG. 3. The digital video formatting system 50 receives digitized samples of the input digitized analog video signal. In the present embodiment, the digital video formatting system 50 receives an input CVBS signal in the digital domain and the n-th sample of the input CVBS signal is denoted as CVBS_in(n). The video signal AGC path generates an output digitized analog video signal, denoted as CVBS_out(n) which has been formatted to have the desired amplitude range and offset correction.

In the video signal AGC path 52, the input digitized analog video signal CVBS_in(n) is first added with an offset correction value O(n) (node 70). The offset correction is denoted as an addition operation at an adder 58 but in actual implementation, the offset correction value O(n) may be added to the input digitized analog video signal CVBS_in(n) using any means and an explicit adder may or may not be necessary. The offset corrected video signal A(n) (node 60) is then provided to an adaptive filter 62. In one embodiment, the adaptive filter 62 is a time varying symmetrical Finite Impulse Response (FIR) filter with coefficients and operating modes that are adapted dynamically. In the present embodiment, the adaptive filter 62 can be operated in one of two operation modes—Mode 0 and Mode 1. The operation mode is selected by a mode selection signal Mode(n) (node 78). Furthermore, in the present embodiment, the adaptive filter 62 receives three coefficients to control the filter operation. Adaptive filter 62 receives a first filter coefficient $H0(n)$ (node 72), a second filter coefficient $H1(n)$ (node 74) and a constant coefficient K (node 76). The adaptive filter 62 operates on the offset corrected video signal A(n) and generates a filtered output signal B(n). The filtered output signal B(n) is then processed by a hard-limiter circuit 66 configured to limit the voltage excursion of the filtered output signal B(n) to a predetermined range, such as from 0 to 1 (V). The hard-limited signal is the output digitized analog video signal CVBS_out(n) formatted with the desired amplitude range and with offset correction.

The filtered output signal B(n) is also provided to the adaptive weight computation block 54 in a feedback loop to compute the offset correction value and the filter coefficients. In this manner, the adaptive weight computation block 54 updates the offset correction value O(n), and the filter coefficients $H0(n)$, $H1(n)$ and the operation mode Mode(n) based on the characteristics of the filtered output signal B(n). The offset correction value and the filter coefficients are thus generated dynamically based on the current samples of the digitized analog video signal value so that over-range or under-range signal values and offset errors of the active video signal are properly corrected.

In embodiments of the present invention, the adaptive filter 62 and the adaptive weight computation block 54 are implemented using an adaptive algorithm defined by the following equations:

Initial: $O(n)=0, dh11(n)=0, dh12(n)=0$, with $n=0$

If($P1(n)>T1$)  (1.a)

→$E1(n)=0$  (1.a.1)

Else→$E1(n)=T1-P1(n)$ (where $P1(n)$ denotes the detected low peak value of the filtered output signal B(n) and T1 denotes the threshold of a low peak detector for detecting the lowest peak value of the analog video signal)

If($O(n-1)<O\_limit$)  (1.b)

→$O(n)=O(n-1)*(1-\lambda\_o1)+E1(n)*\mu\_o1$  (1.b.1)

→$dh11(n)=0$  (1.b.2)

Else→$dh11(n)=dh11(n-1)*(1-\lambda\_h1)-E1(n)*\mu\_h1+\lambda\_o1*O(n-1)$  (1.b.3)

→If($dh11(n-1)>0$)

→$O(n)=O(n-1)*(1-\lambda\_o1)$  (1.b.4)

Else→$O(n)=O\_limit$  (1.b.5)

If($P2(n)<T2$)  (2.a)

→$E2(n)=0$  (2.a.1)

Else $E2(n)=P2(n)-T2$  (2.a.2)

(where $P2(n)$ denotes the detected high peak value of the filtered output signal B(n) and T2 denotes the threshold of a high peak detector for detecting the highest peak value of the analog video signal)

(2.b)

$dh12(n)=dh12(n-1)*(1-\lambda\_h2)-E2(n)*\mu\_h2$  (2.a.3)

(3.a)

Line $A$ Constraint=$2*H0(n)+H1(n)=K$  (3.a.1)

$dh1(n)=dh11(n)+dh12(n)$  (3.a.2)

if($abs(dh1(n))<(1-K)$)

→Mode($n$)=0  (3.a.3)

→$H1(n)=1.0+dh1(n)$  (3.a.4)

→$H0(n)=0$  (3.a.5)

Else Mode($n$)=1  (3.a.6)

$H1(n)=1.0+dh1(n)$  (3.a.7)

$H0(n)=(K-H1(n))/2$  (3.a.8)

If(Mode($n$)=0)  (4.a)

→$B(n)=H1(n)*A(n-N)$  (4.a.1)

Else→$B(n)=H0(n)*(A(n)+A(n-2*N)-2*A(n-N))+K*A(n-N)$  (4.a.2)

Or Equivalently, $B(n)=H1(n)*(A(n-N)-(A(n)+A(n-2*N))/2)+K*(A(n)+A(n-2*N))/2$  (4.a.3)

Figure 5:
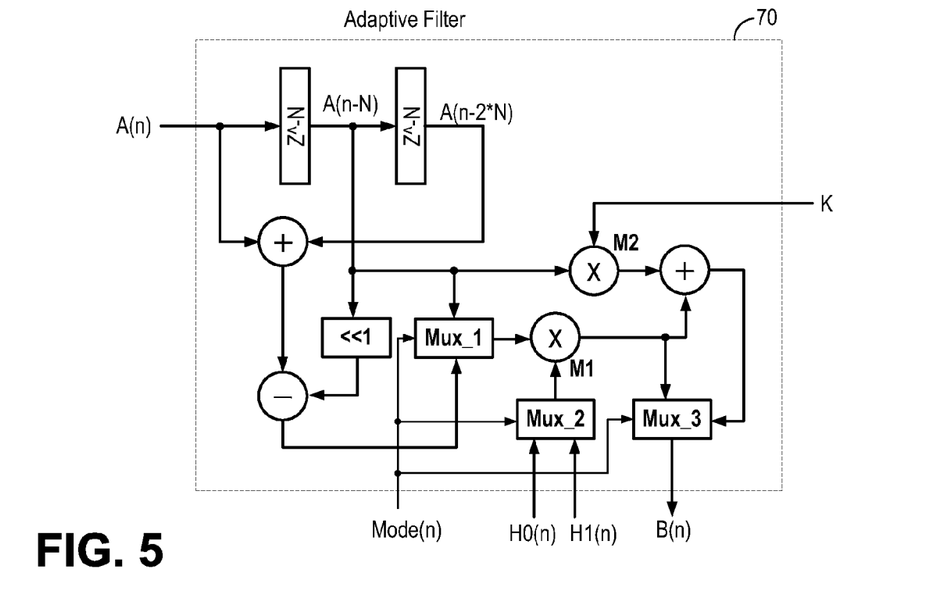
FIGS. 5 and 6 illustrate the filter architectures which can be used to implement the adaptive filter of the video formatting circuit according to embodiments of the present invention.
Figure 6:
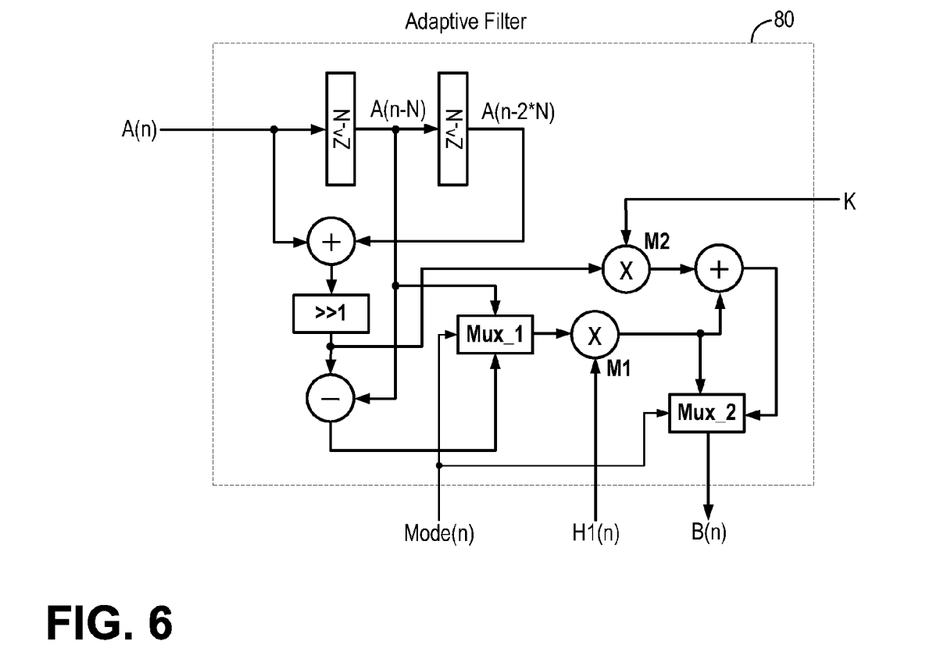

FIGS. 5 and 6 illustrate the filter architectures which can be used to implement the adaptive filter of the video formatting circuit according to embodiments of the present invention. More specifically, FIG. 5 illustrates a filter architecture 70 for implementing equations (4.a.1) and (4.a.2) while FIG. 6 illustrates a filter architecture 80 for implementing equations (4.a.1) and (4.a.3). In both filter architectures 70 and 80, the M2 filter, used for multiplying the constant coefficient K, can be simplified into a low cost implementation by choosing the constant K using reduced binary weight with redundant binary representation, for example, using canonic signed digit. In either filter architecture 70 or 80, the filtered output signal B(n) is generated from the offset corrected input signal A(n) using the filter coefficients $H0(n)$ and $H1(n)$ and based on the operation mode as selected by Mode(n).

Figure 7:
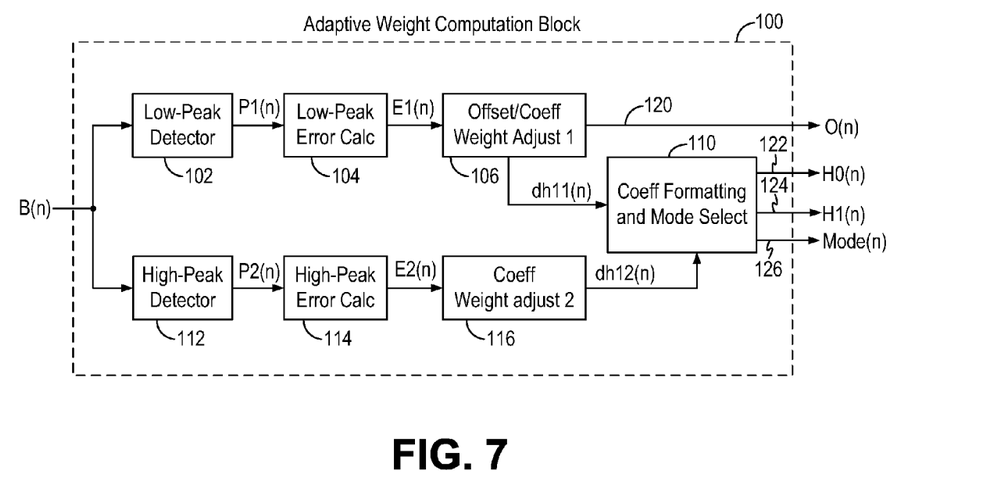
FIG. 7 is a block diagram illustrating the construction of the adaptive offset correction and filter coefficients computation block ("adaptive weight computation block") according to one embodiment of the present invention.

FIG. 7 is a block diagram illustrating the construction of the adaptive offset correction and filter coefficients computation block ("adaptive weight computation block") according to one embodiment of the present invention. In embodiments of the present invention, the adaptive weight computation block implements the adaptation algorithm described above with reference to equations (1.a) to (3.a). Referring to FIG. 7 and the above equations, the adaptive weight computation block 100 receives the filtered output signal B(n) from the adaptive filter and processes the filtered output signal to generate updated values for the offset correction value O(n), the filter coefficient values $H0(n)$ and $H1(n)$ and also the mode selection signal Mode(n). The constant coefficient K can be set to a predetermined value or set by the user.

In adaptive weight computation block 100, the filtered output signal B(n) is first coupled to a low-peak detector 102 configured to detect a low peak value $P1(n)$ of the signal B(n). The low peak value $P1(n)$ is compared with the low peak threshold T1 at the low-peak error calculation block 104 to generate a low peak error value $E1(n)$. The low-peak error value $E1(n)$ is coupled to a first offset/coefficient weight adjust block 106. The offset correction value O(n) (node 120) is generated using equations (1.b) above. The first offset/coefficient weight adjust block 106 also generates an adjust value $dh11(n)$ using equations (1.b) above for a coefficient formatting and mode select block 110.

Furthermore, in adaptive weight computation block 100, the filtered output signal B(n) is also coupled to a high-peak detector 112 configured to detect a high peak value $P2(n)$ of the signal B(n). The high peak value $P2(n)$ is compared with the high peak threshold T2 at the high-peak error calculation block 114 to generate a high peak error value E2(n). The high-peak error value E2(n) is coupled to a second coefficient weight adjust block 116. The second coefficient weight adjust block 116 generates an adjust value dh12(n) using equations (2.b) for the coefficient formatting and mode select block 110.

The coefficient formatting and mode select block 110, receiving the adjust values dh11(n) and dh12(n), generates the first and second filter coefficients H0(n) and H1(n) and the mode selection signal Mode(n) based on equations (3.a) above.

Figure 8:
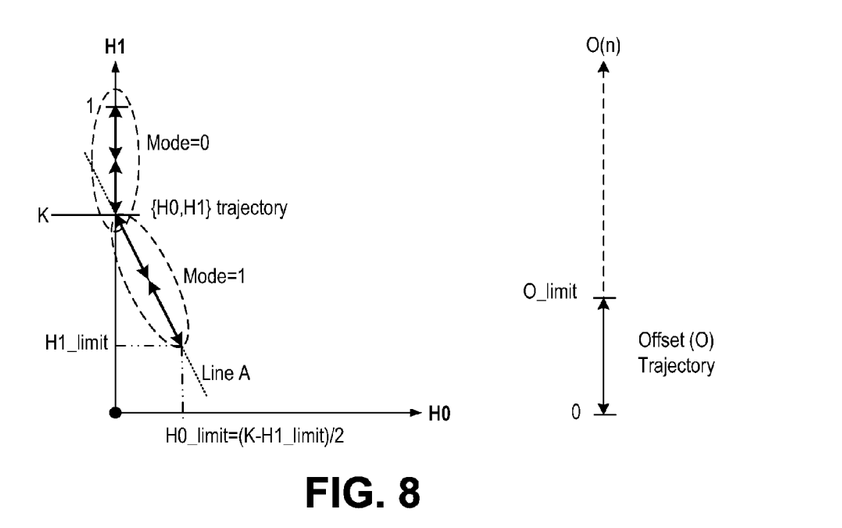
FIG. 8 illustrates the adaptive parameters constrained solution space for the first and second filter coefficients and for the offset correction value according to one embodiment of the present invention.

FIG. 8 illustrates the adaptive parameters constrained solution space for the first and second filter coefficients and for the offset correction value according to one embodiment of the present invention. Referring to FIG. 8, the offset correction value O(n) will vary from a zero value to the maximum offset limit value O_limit.

When the operation mode M0 is selected, the filter coefficient H0(n) is zero (equation (3.a.5)) while the filter coefficient H1(n) is equal to 1+dh1(n) (equation (3.a.4)). The value "dh1(n)" is given by equation (3.a.2) as the sum of the values dh11(n) and dh12(n). Thus, when Mode 0 is selected, the adaptive filter performs flat gain scaling where amplitude of the input digitized analog video signal is scaled down to bring over-ranged signal values to within the desired range. More specifically, in the present description, flat gain scaling refers to scaling of the amplitude of the input digitized analog video signal independent of the frequency of the video signal. That is, the amplitude scaling is applied to the entire video signal without regard to the frequency of the video signal.

When the operation mode M1 is selected, the filter coefficient H0(n) and H1(n) assume the linear relationship depicted by Line A and given as: H1+2H0=K (equation (3.a.1)). Thus, the filter coefficient H1(n) is equal to 1+dh1(n) (equation (3.a.7)) while the filter coefficient H0(n) is equal to (K−H1(n))/2. When Mode 1 is selected, the adaptive filter performs frequency dependent gain scaling where the high frequency components of the input digitized analog video signal is scaled down to reduce overmodulation and ringing in the images. More specifically, in the present description, frequency dependent gain scaling refers to scaling of the input digitized analog video signal based on the frequency of the video signal where components of the video signal having higher signal frequency may receive more amplitude scaling than components of the video signal having lower signal frequency.

Figure 9:
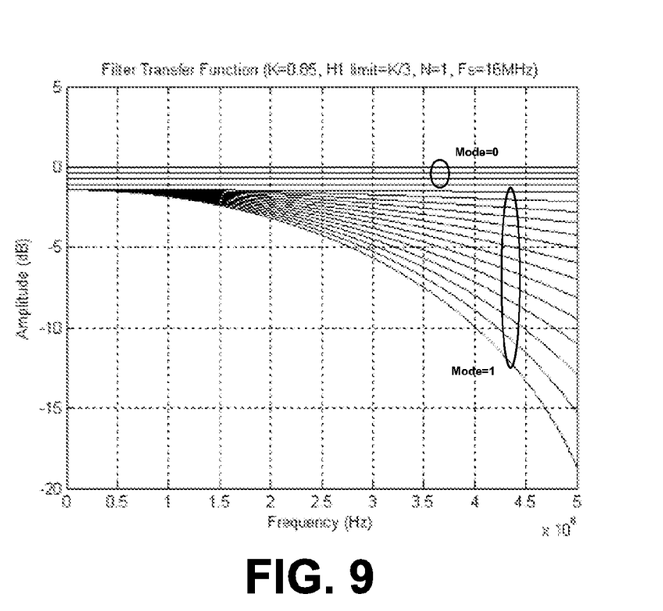
FIG. 9 illustrates examples of filter transfer functions that are generated using the adaptive algorithm described above.

FIG. 9 illustrates examples of filter transfer functions that are generated using the adaptive algorithm described above. Referring to FIG. 9, when the over-range deviations are small, Mode 0 is selected to apply a flat gain scaling to the input digitized analog video signal. The filter transfer function is thus a flat line across the given frequency range. However, when the over-range deviations become large, Mode 1 is selected to apply frequency dependent gain scaling. The filter transfer function has curvatures to provide greater amplitude attenuation at high frequencies.

Figure 10:
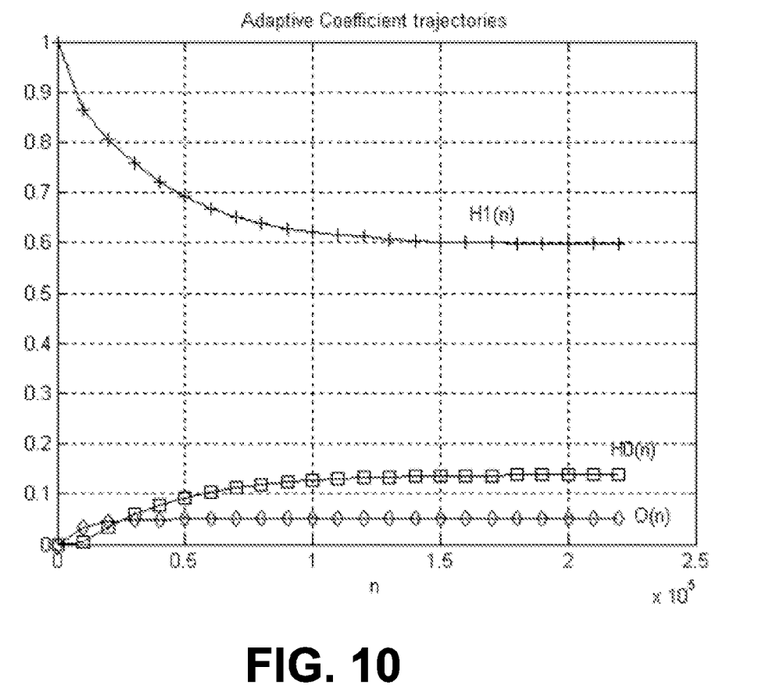
FIG. 10 illustrates the coefficient trajectory for filter coefficients $H0(n)$ and $H1(n)$ and offset correction value $O(n)$ during the adaptive weight computation process according to exemplary embodiments of the present invention.

FIG. 10 illustrates the coefficient trajectory for filter coefficients H0(n) and H1(n) and offset correction value O(n) during the adaptive weight computation process according to exemplary embodiments of the present invention. In the present illustration, the initial values of the H1(n) filter coefficient is 1 while the H0(n) filter coefficient is zero. As the adaptive algorithm progresses, the filter coefficients H0(n) and H1(n) settle at their equilibrium values where H0(n) is about 0.15 and H1(n) is about 0.6. The offset correction value O(n) also settles at a 0.05 value.

Figure 11:
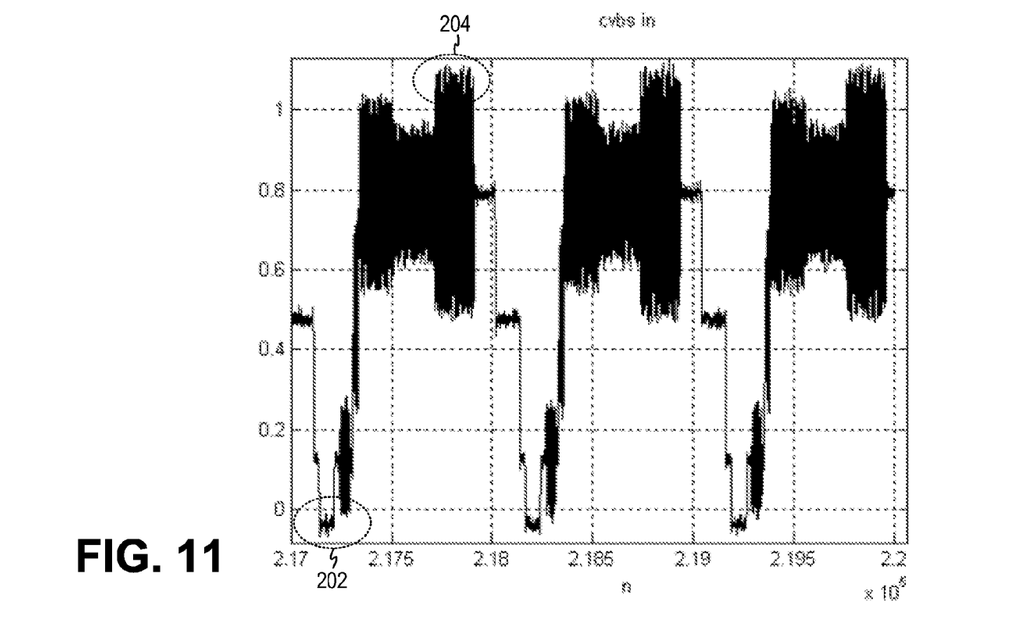
FIGS. 11 and 12 illustrate the input digitized analog video signal and the output digitized analog video signal of the video formatting circuit according to one embodiment of the present invention.
Figure 12:
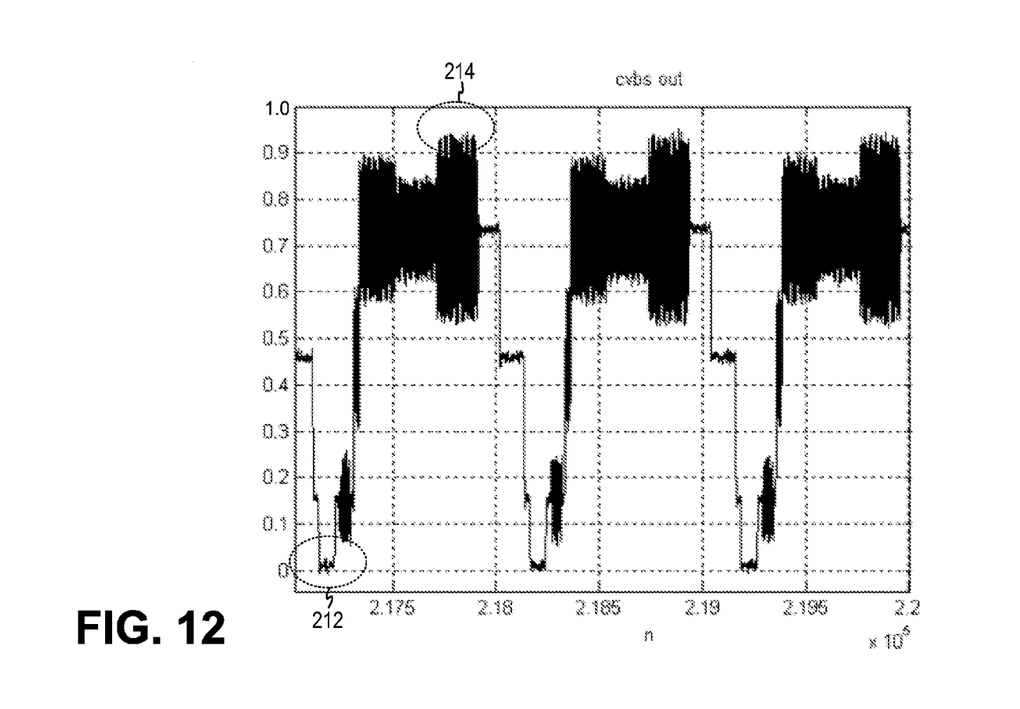

FIGS. 11 and 12 illustrate the input digitized analog video signal and the output digitized analog video signal of the video formatting circuit according to one embodiment of the present invention. Referring first to FIG. 11, the input digitized analog video signal CVBS_in, even after the normalization by the conventional video AGC process, still may suffer from signal offset error (denoted by dotted circle 202) and overmodulated amplitude (denoted by dotted circuit 204). However, after the input analog video signal is subjected t the video formatting circuit of the present invention, the output digitized analog video signal CVBS_out is offset-corrected (denoted by dotted circuit 212) and the amplitude of the video signal is brought to within the desirable range (denoted by dotted circuit 214). In particular, the maximum amplitude of the output video signal CVBS_out is now less than the normalized value of 1.0 whereas the maximum amplitude of the input video signal CVBS_in exceeds the value of 1.0.

In embodiments of the present invention, while the adaptive filter in the video formatting circuit must operate on each input sample of the input digitized analog video signal, the adaptive weight computation block may compute the updated filter coefficients and offset correction values at a rate lower than the sampling frequency. In some embodiments, the adaptive weight computation block may be implemented in a microprocessor associated with the television receiver.

Furthermore, in embodiments of the present invention, the constants $\mu\_h1, \mu\_h2, \lambda\_h2, \lambda\_h1, \lambda\_o1$ used by the adaptive weight computation block can be simplified to be numbers of power of two so that multiplications carried in the adaptation computation block can be replaced by simple shifting operations.

The video formatting circuit of the present invention provides many advantages over conventional systems. First, the video formatting circuit applies signal scaling and offset correction to the input video signal before any lossy hard-limiting operation is applied. Thus, signal integrity is preserved. Second, the adaptive filter coefficients are generated so that the adaptive filter can operate from a simple DC adjustment of flat gain scaling to frequency selective low-pass filtering. When frequency selective low-pass filtering is applied, the chroma component or high frequency luminance components of the video signal is attenuated while the DC level of the video signal is also adjusted.

Third, by using filter coefficients H0 and H1 that are related to each other, the coefficients trajectory space is tightly controlled and can be defined by user parameters, such as the constant K, so that feedback loop stability is ensured. The filter transfer functions solution space can be strictly defined by user parameters.

Lastly, the architecture of the adaptive filter can be kept simple using only three adders/subtractors and a single full-precision filter M1 across the two operating modes. The constant multiplier M2 can be implemented with limited hardware by a judicious choice of the constant value K.

The above detailed descriptions are provided to illustrate specific embodiments of the present invention and are not intended to be limiting. Numerous modifications and variations within the scope of the present invention are possible. The present invention is defined by the appended claims.

We claim:

1. A digital video formatting system for a television signal receiver configured to receive an input digitized analog format video signal and to generate an output digitized analog format video signal, the digital video formatting system comprising:

an offset correction circuit configured to receive the input digitized analog format video signal being an active video signal and to introduce an offset correction value to the input digitized analog format video signal to generate an offset corrected analog video signal;

an adaptive filter configured to receive the offset corrected analog video signal, the adaptive filter operative to filter the offset corrected analog video signal to within a predetermined amplitude range based one or more filter coefficients and based on a selected operation mode, the adaptive filter configured to generate a filtered analog video signal, the filtered analog video signal being used to generate the output digitized analog format video signal; and an adaptive weight computation block configured to receive the filtered analog video signal and to generate, based on characteristics of the filtered analog video signal, the offset correction value, the one or more filter coefficients and a mode selection signal selecting one of two operation modes, wherein the adaptive filter operates in a first operation mode to apply the one or more filter coefficients to scale an amplitude of the offset corrected analog video signal independent of signal frequency, and the adaptive filter further operates in a second operation mode to apply the one or more filter coefficients to scale the amplitude of the offset corrected analog video signal as a function of signal frequency.

2. The digital video formatting system of claim 1, further comprising:

a limiter circuit configured to receive the filtered analog video signal and to limit a maximum signal value and a minimum signal value of the filtered analog video signal to within a predetermined voltage range, thereby generating the output digitized analog format video signal.

3. The digital video formatting system of claim 1, wherein the adaptive filter comprises a time varying symmetrical Finite Impulse Response (FIR) filter.

4. The digital video formatting system of claim 1, wherein the adaptive weight computation block is configured to generate, based on characteristics of the filtered analog video signal, a first filter coefficient H0, a second filter coefficient H1, a third filter coefficient K having a constant value, and the mode selection signal.

5. The digital video formatting system of claim 4, wherein the adaptive weight computation block is configured to generate the mode selection signal to select a first operation mode and to generate the first filter coefficient H0 having a zero value and the second filter coefficient H1 having a non-zero value, the adaptive filter being operative to apply the second filter coefficient H1 to scale the offset corrected analog video signal independent of signal frequency.

6. The digital video formatting system of claim 4, wherein the adaptive weight computation block is configured to generate the mode selection signal to select a second operation mode and to generate the first filter coefficient H0 and the second filter coefficient H1 based on a relationship of H1+2H0=K, the adaptive filter being operative to apply the first and second filter coefficients H0 and H1 to scale the offset corrected analog video signal at high signal frequencies more than at lower signal frequencies.

7. The digital video formatting system of claim 4, wherein the adaptive weight computation block is configured to detect a low amplitude peak value of the filtered analog video signal to determine the offset correction value.

8. The digital video formatting system of claim 7, wherein the adaptive weight computation block is configured to detect a high amplitude peak value of the filtered analog video signal, the low amplitude peak value and the high amplitude peak value being used to determine the first filter coefficient H0, the second filter coefficient H1, and the mode selection signal.

9. A method in a television receiver to format an input digitized analog format video signal and to generate an output digitized analog format video signal, the method comprising:

receiving the input digitized analog format video signal being an active video signal;

introducing an offset correction value to the input digitized analog format video signal to generate an offset corrected analog video signal;

filtering the offset corrected analog video signal to within a predetermined amplitude range based on one or more filter coefficients and based on a selected operation mode to generate a filtered analog video signal;

generating the output digitized analog format video signal indicative of the filtered analog video signal; and generating based on characteristics of the filtered analog video signal the offset correction value, the one or more filter coefficients and a mode selection signal selecting one of two operation modes, wherein filtering the offset corrected analog video signal comprises:

applying the one or more filter coefficients to scale an amplitude of the offset corrected analog video signal independent of signal frequency in a first operation mode; and applying the one or more filter coefficients to scale the amplitude of the offset corrected analog video signal as a function of signal frequency in a second operation mode.

10. The method of claim 9, wherein generating the output digitized analog format video signal indicative of the filtered analog video signal comprises:

limiting a maximum signal value and a minimum signal value of the filtered analog video signal to within a predetermined voltage range to generate the output digitized analog format video signal.

11. The method of claim 9, wherein filtering the offset corrected analog video signal to within a predetermined amplitude range based on one or more filter coefficients and based on a selected operation mode to generate a filtered analog video signal comprises:

filtering the offset corrected analog video signal to within a predetermined amplitude range based on one or more filter coefficients and based on a selected operation mode to generate a filtered analog video signal using a time varying symmetrical Finite Impulse Response (FIR) filter.

12. The method of claim 9, wherein generating the one or more filter coefficients based on characteristics of the filtered analog video signal comprises:

generating, based on the filtered analog video signal, a first filter coefficient H0, a second filter coefficient H1, and a third filter coefficient K having a constant value.

13. The method of claim 12, wherein generating, based on the filtered analog video signal, a first filter coefficient H0, a second filter coefficient H1, and a third filter coefficient K having a constant value comprises:

generating, in the first operation mode, the first filter coefficient H0 having a zero value and the second filter coefficient H1 having a non-zero value; and applying the second filter coefficient H1 to scale the offset corrected analog video signal independent of signal frequency.

14. The method of claim 12, wherein generating, based on the filtered analog video signal, a first filter coefficient H0, a second filter coefficient H1, and a third filter coefficient K having a constant value comprises:

generating, in the second operation mode, the first filter coefficient H0 and the second filter coefficient H1 based on a relationship of H1+2H0=K; and applying the first and second filter coefficients H0 and H1 to scale the offset corrected analog video signal at high signal frequencies more than at lower signal frequencies.

15. The method of claim 12, wherein generating the offset correction value based on characteristics of the filtered analog video signal comprises:

detect a low amplitude peak value of the filtered analog video signal to determine the offset correction value.

16. The method of claim 15, wherein generating, based on the filtered analog video signal, a first filter coefficient H0 and a second filter coefficient H1 comprises:

detecting a high amplitude peak value of the filtered analog video signal; and determining the first filter coefficient H0, the second filter coefficient H1, and the mode selection signal based on the low amplitude peak value and the high amplitude peak value.

17. The digital video formatting system of claim 1, wherein, in the second operation mode, the adaptive filter applies amplitude scaling to attenuate high frequency components more than low frequency components of the offset corrected analog video signal.

18. The digital video formatting system of claim 1, wherein the adaptive weight computation block is configured to receive the filtered analog video signal and to generate the mode selection signal to select the second operation mode when the characteristics of the filtered analog video signal indicate overmodulation or undermodulation of the filtered analog video signal.

19. The method of claim 9, wherein applying the one or more filter coefficients to scale the amplitude of the offset corrected analog video signal as a function of signal frequency in a second operation mode comprises:

applying the one or more filter coefficients to scale the amplitude of high frequency components of the offset corrected analog video signal more than low frequency components of the offset corrected analog video signal.

20. The method of claim 9, wherein applying the one or more filter coefficients to scale the amplitude of the offset corrected analog video signal as a function of signal frequency in a second operation mode comprises:

applying the one or more filter coefficients to scale the amplitude of the offset corrected analog video signal in the second operation mode when the characteristics of the filtered analog video signal indicate overmodulation or undermodulation of the filtered analog video signal.

* * * * *